(12) United States Patent
Ma et al.

(10) Patent No.: US 11,259,273 B2
(45) Date of Patent: Feb. 22, 2022

(54) MULTI-BEAM POLLING BASED TRANSMISSION METHOD AND COMMUNICATIONS DEVICE

(71) Applicant: HUAWEI TECHNOLOGIES CO., LTD., Guangdong (CN)

(72) Inventors: Yingdong Ma, Chengdu (CN); Zhaojun He, Chengdu (CN); Xiaodong Li, Shenzhen (CN); Yong Zhang, Chengdu (CN); Yong Guo, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 19 days.

(21) Appl. No.: 16/831,315

(22) Filed: Mar. 26, 2020

(65) Prior Publication Data

US 2020/0229139 A1    Jul. 16, 2020

Related U.S. Application Data

(63) Continuation of application No. PCT/CN2017/103764, filed on Sep. 27, 2017.

(51) Int. Cl.
*H04W 72/00* (2009.01)
*H04W 72/04* (2009.01)

(52) U.S. Cl.
CPC ....... *H04W 72/005* (2013.01); *H04W 72/044* (2013.01); *H04W 72/0486* (2013.01)

(58) Field of Classification Search
CPC .............. H04B 7/0617; H04W 72/005; H04W 72/042; H04W 72/044; H04W 72/0446;
(Continued)

(56) References Cited

U.S. PATENT DOCUMENTS

2002/0105970 A1    8/2002  Shvodian
2008/0112369 A1*   5/2008  Kwon ................. H04W 28/20
                                                        370/336
(Continued)

FOREIGN PATENT DOCUMENTS

CN    103379595 A    10/2013
CN    103517329 A    1/2014
(Continued)

OTHER PUBLICATIONS

Nitsche Thomas et al : "IEEE 802.11ad: directional 60 GHz communication for multi-Gigabit-per-second Wi-Fi [Invited Paper]", IEEE Communications Magazine,IEEE Service Center, Piscataway, US,vol. 52, No. 12 ,Dec. 1, 2014,pp. 132-141, XP011567636,total 10 pages.

(Continued)

*Primary Examiner* — Kashif Siddiqui
(74) *Attorney, Agent, or Firm* — Womble Bond Dickinson (US) LLP

(57) ABSTRACT

A multi-beam polling based transmission method and apparatus, and a communications device and an electronic device readable storage medium based on the method are disclosed. An access point AP broadcasts a beacon message, where the beacon message is used to indicate duration of a beacon period; and sends a data packet that includes channel use duration to a station STA, where the channel use duration is used to indicate a target slot at which the AP communicates with the STA within a duration range of the beacon period, so that the AP can communicate with the STA at the target slot.

18 Claims, 11 Drawing Sheets

| Octets: 2 | 2 | 6 | 0 or 6 | 0 or 6 | 0 or 2 | 0 or 6 | 0 or 2 | 0 or 4 | variable | 4 |
|---|---|---|---|---|---|---|---|---|---|---|
| Frame Control | Duration/ ID | Address 1 | Address 2 | Address 3 | Sequence Control | Address 4 | QoS Control | HT Control | Frame Body | FCS |

MAC Header

(58) Field of Classification Search
CPC .. H04W 72/0486; H04W 74/06; H04W 84/12
See application file for complete search history.

(56) References Cited

U.S. PATENT DOCUMENTS

| | | | |
|---|---|---|---|
| 2009/0232109 A1* | 9/2009 | Nandagopalan | H04W 72/0446 370/336 |
| 2009/0323611 A1* | 12/2009 | Singh | H04W 74/0875 370/329 |
| 2010/0260138 A1 | 10/2010 | Liu et al. | |
| 2011/0274056 A1* | 11/2011 | Sampath | H04B 7/0695 370/329 |
| 2013/0003662 A1 | 1/2013 | Lee et al. | |
| 2014/0098724 A1 | 4/2014 | Park et al. | |
| 2015/0245292 A1* | 8/2015 | Jeong | H04W 74/04 370/311 |
| 2018/0132253 A1* | 5/2018 | Li | H04W 72/087 |

FOREIGN PATENT DOCUMENTS

| | | |
|---|---|---|
| CN | 104335662 A | 2/2015 |
| CN | 104412691 A | 3/2015 |
| CN | 104756577 A | 7/2015 |
| CN | 105594242 A | 5/2016 |
| WO | 2008087604 A2 | 7/2008 |

OTHER PUBLICATIONS

IEEE P802.11ax /D3.0, Jun. 2018,IEEE P802.11ax /D3.0,Draft Standard for Information technology Telecommunications and information exchange between systems Local and metropolitan area networks Specific requirements;Part 11: Wireless LAN Medium Access Control (MAC) and Physical Layer (PHY) Specifications; Amendment 6: Enhancements for High EfficiencyWLAN;total 682 pages.

* cited by examiner

MULTI-BEAM POLLING BASED TRANSMISSION METHOD AND COMMUNICATIONS DEVICE

CROSS-REFERENCE TO RELATED APPLICATIONS

The present disclosure is a continuation of International Patent Application No. PCT/CN2017/103764, filed on Sep. 27, 2017, the disclosure of which is hereby incorporated by reference in its entirety.

TECHNICAL FIELD

Embodiments of the present disclosure relate to communications technologies, and in particular, to a multi-beam polling based transmission method and a communications device.

BACKGROUND

Wireless local area networks (WLANs) based on an 802.11 protocol has been rapidly developed in recent years due to advantages such as a low device cost, a free frequency band, easy deployment, and the like.

Communication manufacturers hope to use a mature WLAN industry chain to transform the existing WLAN communications technology into one that can be used for outdoor long-distance transmission. The existing WLAN communications technology uses a contention transmission mechanism, whose transmission sequence is shown in FIG. 1. The work procedure is: Before sending data, a node first listens to a channel in a period of time (for example, distributed inter-frame space, "DIFS" shown in FIG. 1); if the channel is idle, the node transmits data; and if the channel is busy, the node performs random backoff and performs re-contention. The node includes time information (for example, a Duration field) of an occupied channel in the data, and other nodes start a timer to enter a waiting state, and re-contends for the channel after the timer stops. In addition, for a problem that a "hidden terminal" is introduced into the contention transmission mechanism in the 802.11 protocol, refer to FIG. 2. To be specific, a station (Station, "STA") STA 1 and a station STA 2 cannot sense each other and are "hidden terminals" for each other. Because of the existence of the "hidden terminal", the two do not know the existence of the other and a collision occurs when the two transmit data to an access point (AP) simultaneously, resulting in decreasing air interface utilization.

When the WLAN is used for outdoor long-distance transmission, a narrow beam high-gain antenna is required to be used to increase a working distance. The narrow beam antenna refers to an antenna with a small beam width of a radiation pattern. The difference between the high-gain antenna and an ordinary antenna lies in that the high-gain antenna has a higher again, and the distance may be longer, but a lobe width is sacrificed; while the ordinary antenna has a lower gain, the distance is shorter, but the lobe width, that is, a coverage range is larger. However, when the contention access mechanism is applied to the narrow beam high-gain antenna, the following problems may exist. (1) If omnidirectional listening is used, that is, the AP listens to every STA, an antenna gain is reduced, a system gain is lost, and a transmission distance is decreased. Moreover, because a narrow beam is used during normal communication, for an outdoor long-distance transmission scenario, there is usually a relatively long distance between the STA 1 and the STA 2, and the two cannot sense each other and are "hidden terminals" for each other. As a quantity of hidden terminals increases, network performance will seriously degrade. (2) If directional listening is used, because of not knowing when the STA 1 and the STA 2 need to transmit data, the AP cannot synchronize with the two (that is, the AP does not know when to align the narrow beam to directions of the STA 1 and the STA 2), resulting in a decrease in capacity and low transmission efficiency.

SUMMARY

Embodiments of the present disclosure provide a multi-beam polling based transmission method and apparatus, and a communications device and an electronic device readable storage medium, to resolve technical problems of poor network performance and low transmission efficiency when a WLAN is used for outdoor long-distance transmission in the prior art.

According to a first aspect, an embodiment of the present disclosure provides a multi-beam polling based transmission method, including:

broadcasting, by an access point AP, a beacon message, where the beacon message is used to indicate duration of a beacon period;

sending a data packet that includes channel use duration to a station STA, where the channel use duration is used to indicate a target slot at which the AP communicates with the STA within a duration range of the beacon period; and communicating with the STA at the target slot.

In one embodiment, before the communicating with the STA at the target slot, the method further includes:

directing, at the target slot, an antenna to the STA corresponding to the target slot.

In one embodiment, the beacon period includes: a beacon header slot and a data transmission slot; and the data transmission slot includes: M repetition periods, where each repetition period includes K slots; and M and K are positive integers greater than or equal to 1.

In one embodiment, the broadcasting, by an access point AP, a beacon message includes:

broadcasting, by the AP, the beacon message at the beacon header slot.

In one embodiment, a quantity M of the repetition periods, and a quantity K of the slots included in each repetition period are parameters preconfigured for the AP;

or the beacon message further includes a quantity M of the repetition periods, and a quantity K of the slots included in each repetition period.

In one embodiment, before the sending a data packet that includes channel use duration to a station STA, the method further includes:

determining, by the AP, communication duration based on a data volume of communication performed with the STA; and adjusting, based on the target slot corresponding to the STA, the communication duration to obtain the channel use duration.

In one embodiment, the adjusting, based on the target slot corresponding to the STA, the communication duration includes:

adjusting the communication duration, so that a value obtained from a modulo operation on the adjusted communication duration using the slot quantity K is used to indicate the target slot at which the STA communicates with the AP.

In one embodiment, the sending a data packet that includes channel use duration to a station STA includes:

including the channel use duration into at least one of the following data packets for transmission to the STA:

a media access control MAC data packet, a request to send RTS data packet, a clear to send CTS data packet, and a decline to send DTS data packet.

According to a second aspect, an embodiment of the present disclosure provides a multi-beam polling based transmission method, including:

obtaining, by a station STA, a beacon message broadcast by an access point AP, where the beacon message is used to indicate duration of a beacon period;

receiving a data packet that includes channel use duration and that is sent by the AP;

determining, based on the channel use duration in the data packet, a target slot at which the STA communicates with the AP within a duration range of the beacon period; and communicating with the AP at the target slot.

In one embodiment, the beacon period includes: a beacon header slot and a data transmission slot; and the data transmission slot includes: M repetition periods, where each repetition period includes K slots; and M and K are positive integers greater than or equal to 1.

In one embodiment, the obtaining, by a station STA, a beacon message broadcast by an access point AP includes:

obtaining, at the beacon header slot, the beacon message broadcast by the AP; and after the obtaining, by a station STA, a beacon message broadcast by an access point AP, the method further includes:

performing, by the STA, slot division on the data transmission slot based on duration of the beacon period, and a quantity M of the repetition periods and a quantity K of the slots included in each repetition period.

In one embodiment, the method further includes:

the quantity M of the repetition periods, and the quantity K of the slots included in each repetition period are parameters preconfigured for the STA; or the beacon message further includes the quantity M of the repetition periods, and the quantity K of the slots included in each repetition period; and after the obtaining, by a station STA, a beacon message broadcast by an access point AP, the method further includes:

parsing, by the STA, the beacon message, to obtain the quantity M of the repetition periods, and the quantity K of the slots included in each repetition period.

In one embodiment, the determining, based on the channel use duration in the data packet, a target slot at which the STA communicates with the AP within a duration range of the beacon period includes:

performing, based on the channel use duration, a modulo operation using the slot quantity K, where a value obtained after the modulo operation is performed is used to indicate the target slot at which the STA communicates with the AP.

In one embodiment, the receiving a data packet that includes channel use duration and that is sent by the AP includes:

Receiving the channel use duration that is sent by the AP and that is included in at least one of the following data packets:

a media access control MAC data packet, a request to send RTS data packet, a clear to send CTS data packet, and a decline to send DTS data packet.

According to a third aspect, an embodiment of the present disclosure provides a multi-beam polling based transmission apparatus, including:

a broadcast module, configured to broadcast a beacon message, where the beacon message is used to indicate duration of a beacon period;

a sending module, configured to: send a data packet that includes channel use duration to a station STA, where the channel use duration is used to indicate a target slot at which the AP communicates with the STA within a duration range of the beacon period; and communicate with the STA at the target slot.

In one embodiment, the apparatus further includes:

a directional module, configured to direct, at the target slot, an antenna to the STA corresponding to the target slot.

In one embodiment, the beacon period includes: a beacon header slot and a data transmission slot; and the data transmission slot includes: M repetition periods, where each repetition period includes K slots; and M and K are positive integers greater than or equal to 1.

In one embodiment, the broadcast module is specifically configured to broadcast the beacon message at the beacon header slot.

In one embodiment, the apparatus further includes:

a storage module, configured to prestore a quantity M of the repetition periods, and a quantity K of the slots included in each repetition period; or the beacon message further includes a quantity M of the repetition periods, and a quantity K of the slots included in each repetition period.

In one embodiment, the apparatus further includes:

a processing module, configured to: determine communication duration based on a data volume of communication performed with the STA; and adjust, based on the target slot corresponding to the STA, the communication duration to obtain the channel use duration.

In one embodiment, the processing module is specifically configured to adjust the communication duration, so that a value obtained from a modulo operation on the adjusted communication duration using the slot quantity K is used to indicate the target slot at which the STA communicates with the AP.

In one embodiment, the sending module is specifically configured to include the channel use duration into at least one piece of the following information for transmission to the STA:

a media access control MAC data packet, a request to send RTS data packet, a clear to send CTS data packet, and a decline to send DTS data packet.

According to a fourth aspect, an embodiment of the present disclosure further provides a multi-beam polling based transmission apparatus, including:

an obtaining module, configured to obtain a beacon message broadcast by an access point AP, where the beacon message is used to indicate duration of a beacon period; and is further configured to receive a data packet that includes channel use duration and that is sent by the AP;

a determining module, configured to determine, based on the channel use duration in the data packet, a target slot at which the determining module communicates with the AP within a duration range of the beacon period; and a communications module, configured to communicate with the AP at the target slot.

In one embodiment, the beacon period includes: a beacon header slot and a data transmission slot; and the data transmission slot includes: M repetition periods, where each repetition period includes K slots; and M and K are positive integers greater than or equal to 1.

In one embodiment, the obtaining module is specifically configured to obtain, at the beacon header slot, the beacon message broadcast by the AP; and the determining module is further configured to perform slot division on the data transmission slot based on duration of the beacon period and a quantity M of the repetition periods and a quantity K of the slots included in each repetition period.

In one embodiment, the apparatus further includes:

a storage module, configured to prestore the quantity M of the repetition periods, and the quantity K of the slots included in each repetition period; or the beacon message further includes the quantity M of the repetition periods, and the quantity K of the slots included in each repetition period; and the apparatus further includes:

a parsing module, configured to parse the beacon message, to obtain the quantity M of the repetition periods, and the quantity K of the slots included in each repetition period.

In one embodiment, the determining module is specifically configured to perform, based on the channel use duration, a modulo operation using the slot quantity K, where a value obtained after the modulo operation is performed is used to indicate the target slot at which the STA communicates with the AP.

In one embodiment, the obtaining module is specifically configured to receive the channel use duration that is sent by the AP and that is included in at least one of the following data packets:

a media access control MAC data packet, a request to send RTS data packet, a clear to send CTS data packet, and a decline to send DTS data packet.

According to a fifth aspect, an embodiment of the present disclosure provides a communications device, including a transmitter and a processor, where the transmitter is configured to broadcast a beacon message, where the beacon message is used to indicate duration of a beacon period; and is further configured to send a data packet that includes channel use duration to a station STA, where the channel use duration is used to indicate a target slot at which the AP communicates with the STA within a duration range of the beacon period; and the processor is configured to communicate with the STA at the target slot.

In one embodiment, the processor is further configured to direct, at the target slot, an antenna to the STA corresponding to the target slot.

In one embodiment, the beacon period includes: a beacon header slot and a data transmission slot; and the data transmission slot includes: M repetition periods, where each repetition period includes K slots; and M and K are positive integers greater than or equal to 1.

In one embodiment, the transmitter is specifically configured to broadcast the beacon message at the beacon header slot.

In one embodiment, the apparatus further includes: a memory, where the memory is configured to prestore a quantity M of the repetition periods, and a quantity K of the slots included in each repetition period;

or the beacon message further includes a quantity M of the repetition periods, and a quantity K of the slots included in each repetition period.

In one embodiment, the processor is specifically configured to: determine communication duration based on a data volume of communication performed with the STA; and adjust, based on the target slot corresponding to the STA, the communication duration to obtain the channel use duration.

In one embodiment, the processor is specifically configured to adjust the communication duration, so that a value obtained from a modulo operation on the adjusted communication duration using the slot quantity K is used to indicate the target slot at which the STA communicates with the AP.

In one embodiment, the transmitter is configured to include the channel use duration into at least one of the following data packets for transmission to the STA:

a media access control MAC data packet, a request to send RTS data packet, a clear to send CTS data packet, and a decline to send DTS data packet.

According to a sixth aspect, an embodiment of the present disclosure provides a communications device, including a receiver and a processor, where the receiver is configured to receive a beacon message broadcast by an access point AP, where the beacon message is used to indicate duration of a beacon period; and is further configured to receive a data packet that includes channel use duration and that is sent by the AP; and the processor is configured to determine, based on the channel use duration in the data packet, a target slot at which the processor communicates with the AP within a duration range of the beacon period; and is further configured to communicate with the AP at the target slot.

In one embodiment, the beacon period includes: a beacon header slot and a data transmission slot; and the data transmission slot includes: M repetition periods, where each repetition period includes K slots; and M and K are positive integers greater than or equal to 1.

In one embodiment, the receiver is specifically configured to receive, at the beacon header slot, the beacon message broadcast by the access point AP; and the processor is further configured to perform slot division on the data transmission slot based on duration of the beacon period, and a quantity M of the repetition periods and a quantity K of the slots included in each repetition period.

In one embodiment, the apparatus further includes: a memory, where the memory is configured to prestore the quantity M of the repetition periods, and the quantity K of the slots included in each repetition period; or the beacon message further includes the quantity M of the repetition periods, and the quantity K of the slots included in each repetition period; and the processor is further configured to parse the beacon message, to obtain the quantity M of the repetition periods, and the quantity K of the slots included in each repetition period.

In one embodiment, the processor is further configured to perform, based on the channel use duration, a modulo operation using the slot quantity K, where a value obtained after the modulo operation is performed is used to indicate the target slot at which the STA communicates with the AP.

In one embodiment, the receiver is specifically configured to receive the channel use duration that is sent by the AP and that is included in at least one of the following data packets:

a media access control MAC data packet, a request to send RTS data packet, a clear to send CTS data packet, and a decline to send DTS data packet.

According to a seventh aspect, an embodiment of the present disclosure provides an electronic device readable storage medium, including a program. When the program runs on an electronic device, the electronic device is enabled to perform the method according to any one of the foregoing embodiments.

In can be learned that, in the foregoing aspects, according to the multi-beam polling based transmission method and apparatus, and the communications device and the electronic device readable storage medium that are provided in the embodiments of the present disclosure, the access point AP broadcasts the beacon message, where the beacon message is used to indicate the duration of the beacon period; and sends the data packet that includes the channel use duration to the station STA, where the channel use duration is used to indicate the target slot at which the AP communicates with the STA within the duration range of the beacon period, so that the AP can communicate with the STA at the target slot. In this way, the AP polls the STA based on multiple beams. By allocating the target slot to the STA, directional communication can be used to replace omnidirectional communication, and this helps to improve a system gain while ensuring long-distance transmission. Moreover, orderly communication between each STA and the AP can be implemented, thereby improving interaction efficiency, and greatly alleviating a problem of communication collisions between STAs.

DESCRIPTION OF EMBODIMENTS

Figure 3:
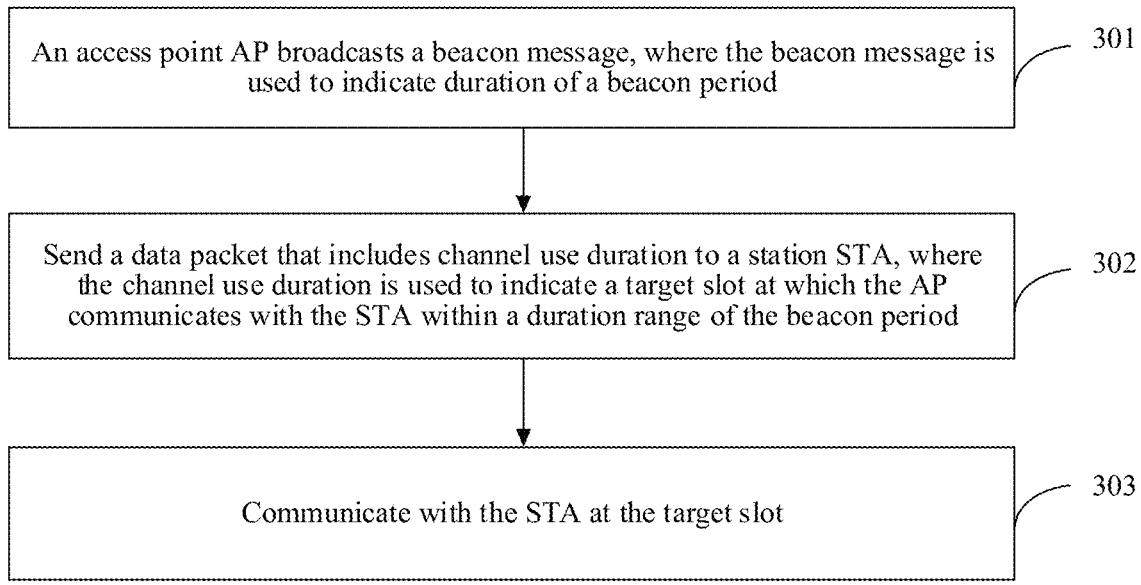
FIG. 3 is a schematic flowchart of a multi-beam polling based transmission method according to an embodiment of the present disclosure.

FIG. 3 is a schematic flowchart of a multi-beam polling based transmission method according to an embodiment of the present disclosure. As shown in FIG. 3, this embodiment provides a multi-beam polling based transmission method, which can be applied to an apparatus configured to perform the multi-beam polling based transmission method. In this embodiment, the solution is described by using an AP as an execution body. The AP is an access point through which a mobile computer user enters a wired Ethernet backbone. A narrow beam high-gain antenna is disposed on the AP, to implement outdoor long-distance transmission. The AP may be an access point device such as a mobile terminal device, a base station device, a router device, a wireless switch, a server device, and the like. The multi-beam polling based transmission method specifically includes the following operations.

Operation 301. The access point AP broadcasts a beacon message, where the beacon message is used to indicate duration of a beacon period.

Specifically, the AP broadcasts the beacon message on a communications channel, so that each STA that listens to the communications channel can detect the beacon message. The beacon message includes information indicating an attribute of the beacon period, for example, the duration of the beacon period, so that each STA that detects the broadcast information can perform slot interval division on the beacon period based on the duration of the beacon period, and calculates information such as a slot at which the STA directionally communicates with the AP.

Operation 302. Send a data packet that includes channel use duration to a station STA, where the channel use duration is used to indicate a target slot at which the AP communicates with the STA within a duration range of the beacon period.

Operation 303. Communicate with the STA at the target slot.

Figure 1:
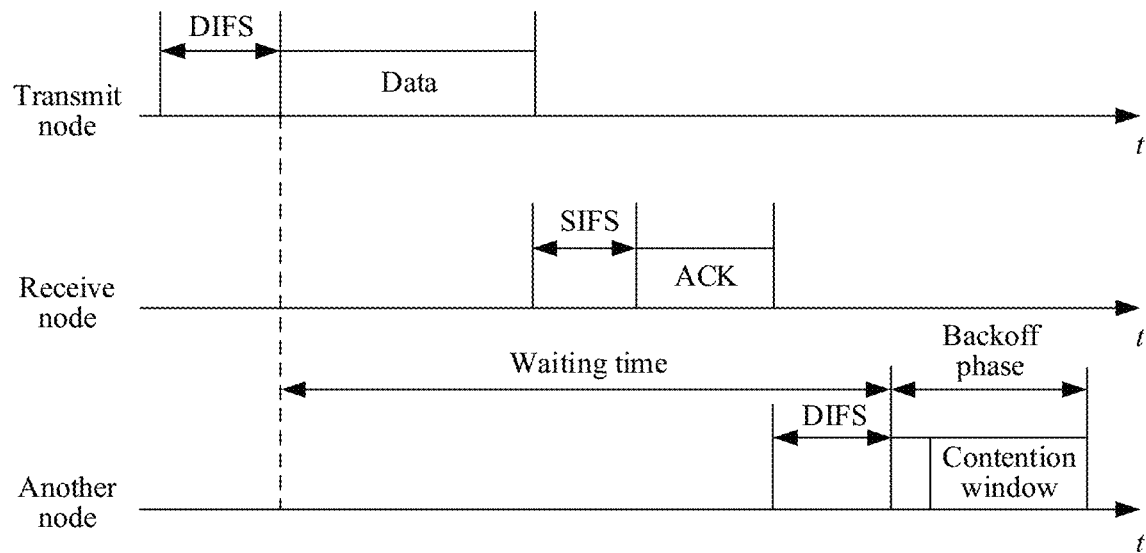
FIG. 1 a transmission sequence diagram based on an 802.11 protocol in the prior art.
Figure 2:
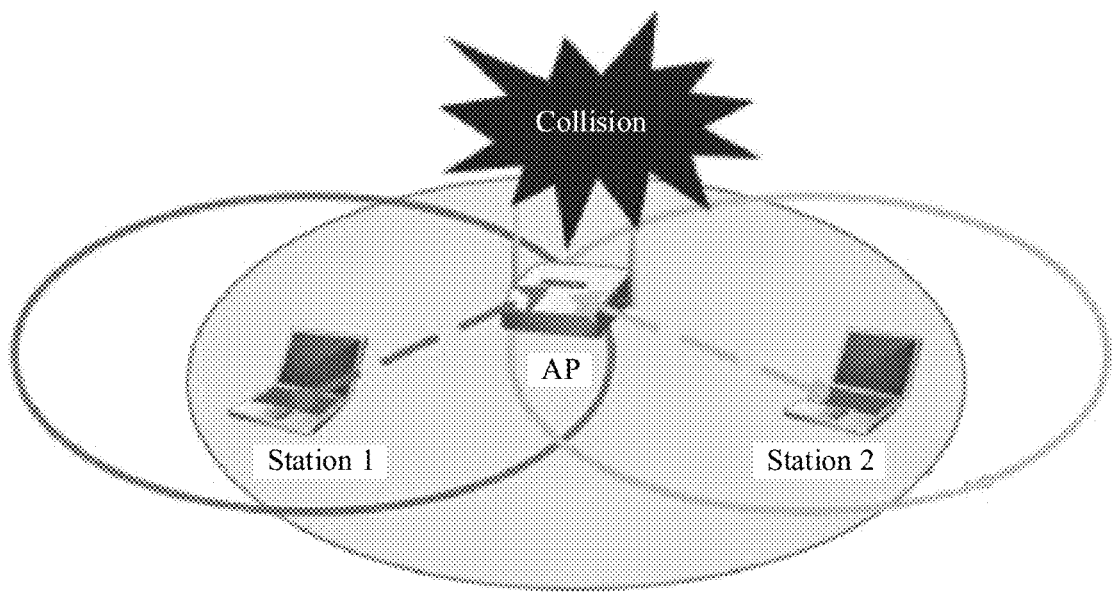
FIG. 2 is a schematic diagram of a collision between hidden terminals in the prior art.
Figure 4:
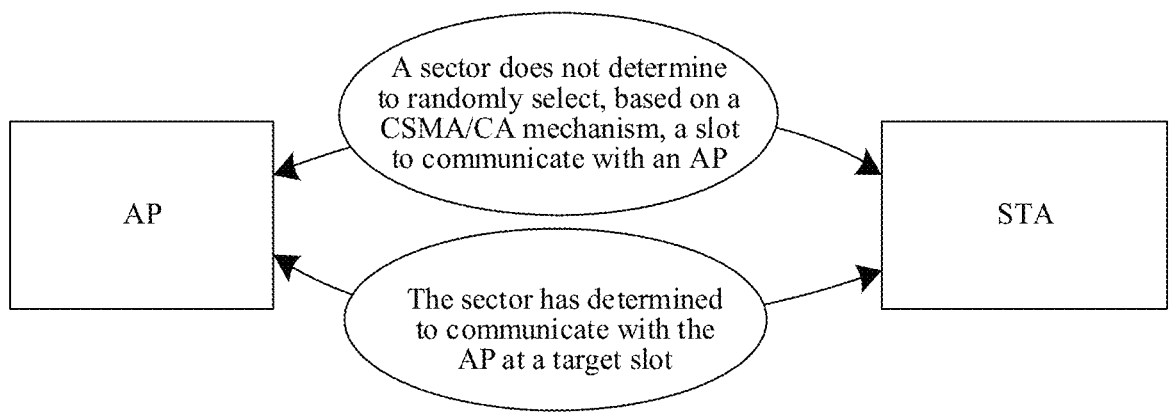
FIG. 4 is a schematic diagram of an STA work state according to an embodiment shown in FIG. 1.

Specifically, the channel use duration is communication duration allocated to the STA by the AP. The channel use duration also implies a specific slot within the duration range of the beacon period, that is, the target slot, at which the STA can communicate with the AP. The channel use duration may be included in a specified field (for example, a duration field) of data signaling or control signaling for the AP to communicate with the STA, so that the STA calculates, based on the channel use duration, the specific slot that is of the beacon period and at which the STA is located, that is, the STA obtains the target slot, thereby communicating with the AP at the target slot. To be specific, the AP uses a mechanism in which the AP directionally communicates with the STA. By specifying the slot at which each STA communicates with the AP, the AP directs, only at the target slot, a beam to a sector in which an STA corresponding to the target slot is located. Therefore, for the STA, if the STA does not receive the data packet that is sent by the AP to the STA and that indicates the channel use duration, a communications sector in which the STA communicates with the AP is not determined, and the STA randomly selects, based on a carrier sense multiple access with collision avoidance (CSMA/CA) mechanism shown in FIG. 1, a slot to transmit a signal. The CSMA/CA uses an ACK signal to avoid collision, that is, only when receiving the ACK signal returned from the network, a transmit end acknowledges that the sent data has correctly arrived at a destination address. As described in the prior art, when the technology is used, the station cannot detect whether there is a collision on the channel when sending the data packet, and the station can only try to "avoid" a collision. Therefore, if the STA sends the data packet at the slot that is not specified by the AP for the STA, or the STA does not receive the data packet that is sent by the AP and that includes the channel use duration, the STA may use the CSMA/CA mechanism in the prior art to communicate with the AP. When the STA receives the data packet that is sent by the AP and that includes the channel use duration, it indicates that the sector in which the STA communicates with the AP is determined. When the target slot arrives, the antenna of the AP directs to the sector corresponding to the target slot, and the AP and the STA transmit a communications signal based on the specified slot. For the work state of the STA, refer to FIG. 4.

In the multi-beam polling based transmission method provided in this embodiment, the access point AP broadcasts the beacon message, where the beacon message is used to indicate the duration of the beacon period; and sends the data packet that includes the channel use duration to the station STA, where the channel use duration is used to indicate the target slot at which the AP communicates with the STA within the duration range of the beacon period, so that the AP can communicate with the STA at the target slot. In this way, the AP polls the STA based on multiple beams. By allocating the target slot to the STA, directional communication can be used to replace omnidirectional communication, and this helps to improve a system gain while ensuring long-distance transmission. Moreover, orderly communication between each STA and the AP can be implemented, thereby improving interaction efficiency, and greatly alleviating a problem of communication collisions between STAs.

Figure 5:
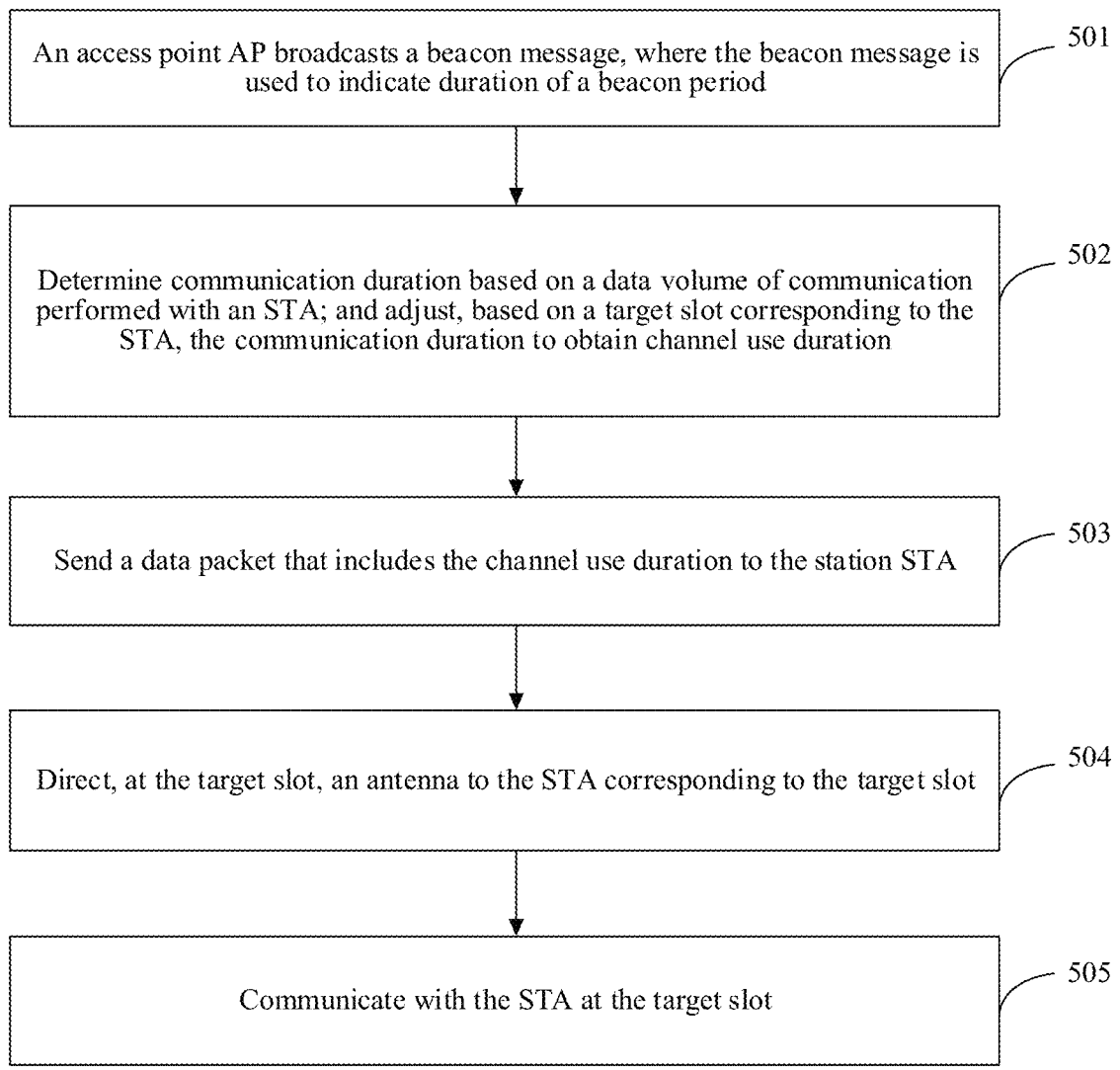
FIG. 5 is a schematic flowchart of a multi-beam polling based transmission method according to another embodiment of the present disclosure.

FIG. 5 is a schematic flowchart of a multi-beam polling based transmission method according to another embodiment of the present disclosure. As shown in FIG. 5, based on the foregoing embodiment, this embodiment provides a multi-beam polling based transmission method, including the following operations.

Operation 501. An access point AP broadcasts a beacon message, where the beacon message is used to indicate duration of a beacon period.

Figure 6:
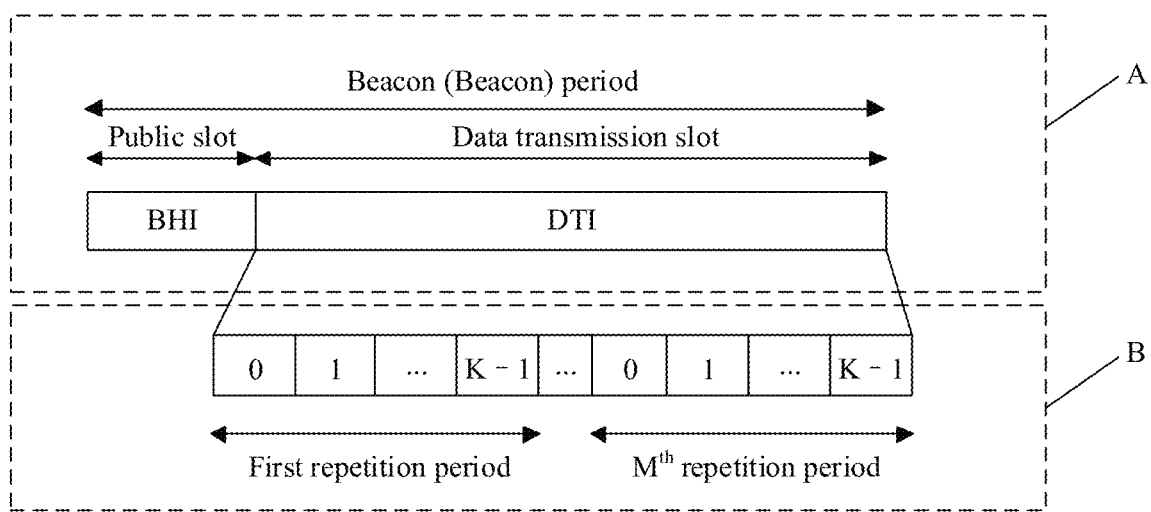
FIG. 6 is a schematic structural diagram of a beacon period according to an embodiment shown in FIG. 5.

Specifically, the beacon period may include: a beacon header Interval (BHI), and a data transmission slot (Data transmission Interval, "DTI"). The AP broadcasts the beacon message in a duration range of the beacon header slot. Usually, the BHI occupies a public slot, for example, duration of 2 ms, or hundreds of microseconds for transmission. Duration of the public slot may be configured by a person skilled in the art based on characteristics of a channel. This is not specifically limited in the present disclosure. The duration of the DTI needs to be calculated based on the duration that is of the beacon period and that is indicated in the beacon message. For example, the beacon period is 100 ms, the BHI occupies 2 ms, and the DTI occupies 98 ms. The data transmission slot DTI includes: M repetition periods, where each repetition period includes K slots; and M and K are positive integers greater than or equal to 1. Therefore, after receiving the beacon message, the STA may first determine a structure of the beacon period shown in a part A of FIG. 6, and then determine, based on a quantity M of the repetition periods, and a quantity K of the slots included in each repetition period, a slot division structure of the beacon period shown in a part B of FIG. 6.

The quantity M of the repetition periods, and the quantity K of the slots included in each repetition period may be parameters preconfigured for the AP and each STA. To be specific, after a controller that controls the AP and a controller that controls the STA are started, values of M and K are preset in control software, so that after receiving the broadcast message of the beacon period, the STA can obtain, based on the known M and K, a beacon period configuration synchronized with the beacon period set by the AP. The solution of presetting M and K can effectively reduce overheads consumed in transmitting M and K, thereby reducing channel resources.

In one embodiment, to implement a more flexible beacon period division, and enable the AP to more flexibly allocate the specified target slot based on attribute information such as channel quality, a quantity of STAs, and distribution of the STAs, the parameter values of M and K may also be sent to each STA with the beacon broadcast message. Therefore, the quantity M of the repetition periods, and the quantity K of the slots included in each repetition period may be included in the beacon message, so that the STA parses the beacon message to obtain parameters such as M and K, thereby performing flexible slot division on the DTI.

Operation 502. Determine communication duration based on a data volume of communication performed with an STA; and adjust, based on a target slot corresponding to the STA, the communication duration to obtain channel use duration.

Specifically, the channel use duration sent by the AP to the STA is composed of two parts of time. One part is actual duration required for the AP to communicate with the STA (that is, the communication duration), and this part of duration is determined based on a data volume used for the AP to complete communication once with the STA. The other part is the adjusted channel use duration obtained by adding, based on the first part of duration, the additional information used by the AP to indicate, to the STA, the target slot at which the STA communicates with the AP. To be specific, the communication duration added with the additional information includes information about the target slot at which the STA communicates with the AP. The value of the additional information may indicate the target slot based on a value obtained from a modulo operation on the finally determined channel use duration using the slot quantity K. For example, an STA needs to transmit data with the AP at a third slot of each repetition period of the beacon period, and the quantity M of the repetition periods is equal to 7, the STA communicates with the AP at the third slot of each repetition period when M=1 to M=7. If each repetition period includes K=7 slots, the communication duration for successfully completing data transmission based on the data volume needs 1996 microseconds. Based on 1996mod7=1, it can be learned that the remainder is 1 and the configuration that the target slot is the third slot is not satisfied. Therefore, two microseconds need to be added based on 1996 microseconds, to obtain 1998 microseconds (1996mod7=3), and 1998 microseconds is the channel use duration that is determined by the AP and that is configured for the STA. A correspondence between the value obtained after the modulo operation is performed using K and the target slot may be a one-to-one correspondence between values in the foregoing examples. To be specific, a target slot corresponding to the remainder 3 obtained after the modulo operation is performed is the third slot. A person skilled in the art may also configure another correspondence between the remainder obtained after the modulo operation is performed and the target slot, for example, the remainder 0 obtained after the modulo operation is performed corresponds to a first slot of the target slot, and the remainder 1 obtained after the modulo operation is performed corresponds to a second slot of the target slot, that is, a value obtained by adding 1 to the remainder obtained after the modulo operation is performed using K has one-to-one correspondence with the target slot value. It should be noted that, the modulo operation algorithm is only used as an example to describe how to correspond the duration information to the target slot. The essence is to use the communication duration information in the data packet to deliver sector information. Therefore, a person skilled in the art may use other computing manners.

Operation 503. Send a data packet that includes the channel use duration to the station STA.

Figure 7A:
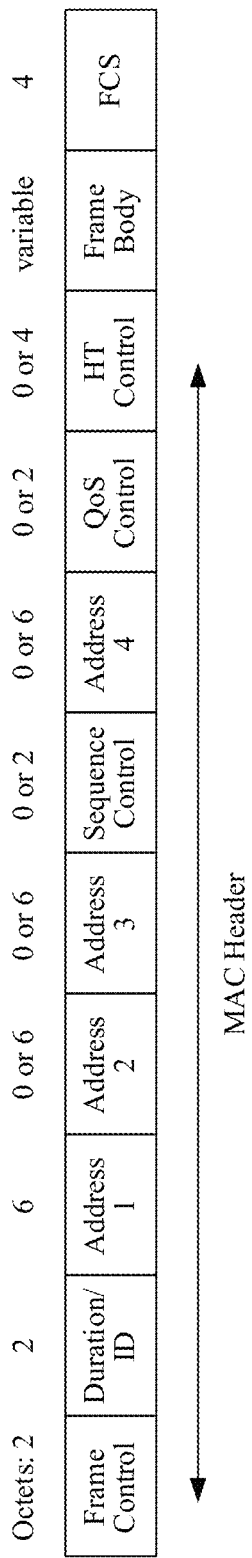
FIG. 7a to FIG. 7d are schematic diagrams of various types of data packet formats according to an embodiment shown in FIG. 5.
Figure 7B:
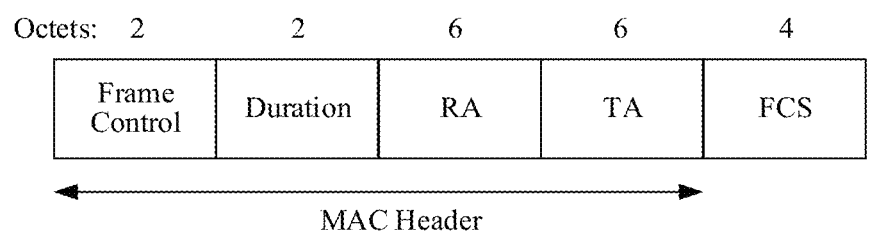
Figure 7C:
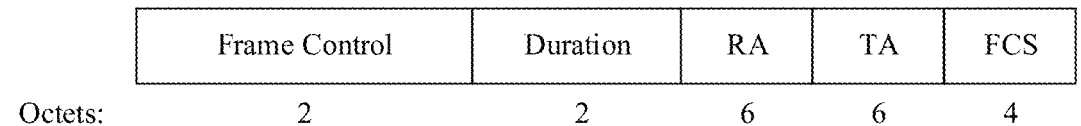
Figure 7D:
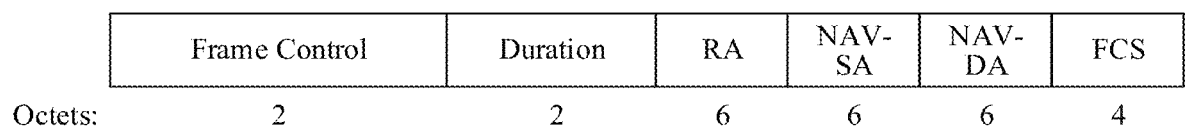

Specifically, the channel use duration implies information indicating the target slot at which the AP communicates with the STA within the duration range of the beacon period. To minimize the modification of the existing 802.11 protocol, and to achieve a technical objective of this embodiment, the channel use duration information may be included in at least one of the following data packets existing in the prior art for transmission to the STA: a media access control MAC data packet, a request to send (RTS) data packet, a clear to send (CTS) data packet, and a decline to send (DTS) data packet. The basic concept of the RTS/CTS transmission mechanism is that before data is sent, a small segment of a request to send RTS packet is first sent to a target end, and the transmission starts after the target end responds to the CTS packet. An RTS/CTS handshake program is used to ensure that no collision occurs when data is subsequently transmitted. Because the packet of the RTS/CTS is small, invalid overheads of transmission are reduced. However, due to the existence of the "hidden terminal" in the background, even if the RTS/CTS transmission mechanism is used, collisions between stations cannot be avoided. Because the RTS/CTS packet is short, even if there is a collision, the loss is limited. However, if the AP beam polling solution of the present disclosure is used based on the RTS/CTS transmission mechanism, the occurrence of collision can be avoided to the greatest extent. Therefore, the AP may include the duration information in the RTS/CTS data packet, so that the STA communicates with the AP at the specified target slot. For example, the duration information may be set in a second field of each data packet shown in FIG. 7a to FIG. 7d. FIG. 7a shows an 802.11 MAC data packet format, FIG. 7b shows an RTS data packet format, FIG. 7c shows a CTS data packet format, and FIG. 7d shows a DTS data packet format, so that after parsing the second field Duration of each data packet, the STA obtains a parameter value of the duration. It should be noted that the data packets described above are only examples and are not intended to limit this embodiment. It can be understood that the channel use duration may be included in any type of data packets used for the AP to communicate with the STA.

Operation 504. Direct, at the target slot, an antenna to the STA corresponding to the target slot.

Specifically, the AP directs, at the target slot, the antenna to the STA direction to which the target slot belongs, so that an electromagnetic wave transmitted by the antenna is aligned with the specified sector in which the STA communicates with the AP at the target slot, thereby implementing one-to-one directional communication.

Operation 505. Communicate with the STA at the target slot.

Figure 8:
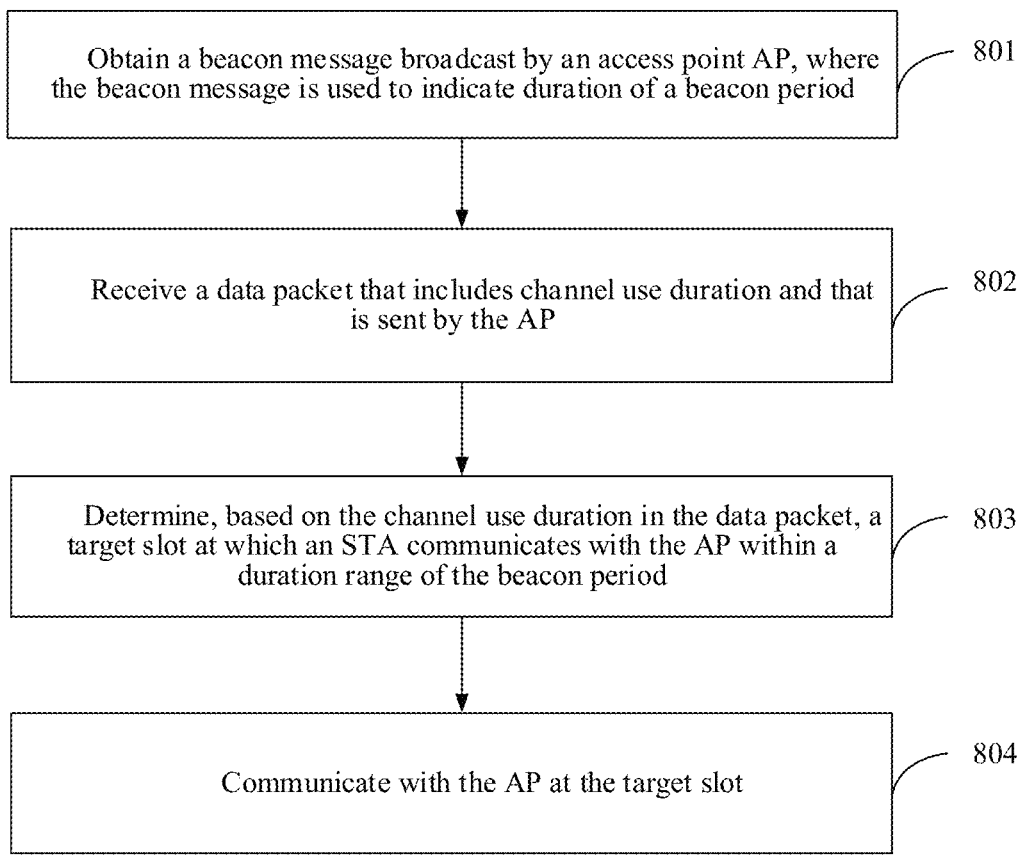
FIG. 8 is a schematic flowchart of a multi-beam polling based transmission method according to an embodiment of the present disclosure.

FIG. 8 is a schematic flowchart of a multi-beam polling based transmission method according to an embodiment of the present disclosure. As shown in FIG. 8, in this embodiment, each STA is used as an execution body to describe the solution, and any device that accesses a wireless AP may be used as the STA in this embodiment, for example, a base station device. The multi-beam polling based transmission method provided in this embodiment includes the following operations.

Operation 801. Obtain a beacon message broadcast by an access point AP, where the beacon message is used to indicate duration of a beacon period.

Specifically, the STA listens to the beacon message broadcast by the AP on a communications channel, for example, listens to the beacon message broadcast by the AP in a distributed inter-frame space DIFS before sending data. The beacon message includes information indicating an attribute of the beacon period, for example, the duration of the beacon period, so that each STA that detects the broadcast information can perform slot interval division on the beacon period based on the duration of the beacon period, and calculates information such as a slot at which the STA directionally communicates with the AP.

Operation 802. Receive a data packet that includes channel use duration and that is sent by the AP.

Operation 803. Determine, based on the channel use duration in the data packet, a target slot at which the STA communicates with the AP within a duration range of the beacon period Operation 804. Communicate with the AP at the target slot.

Specifically, the channel use duration implies information used to indicate the target slot at which the AP communicates with the STA within the duration range of the beacon period. The channel use duration may be included in a specified field (for example, a duration field) of data signaling or control signaling for the AP to communicate with the STA, so that the STA calculates, based on the channel use duration, the specific slot that is of the beacon period and at which the STA is located, that is, the STA obtains the target slot, thereby communicating with the AP at the target slot. To be specific, the AP uses a mechanism in which the AP directionally communicates with the STA. By specifying the slot at which each STA communicates with the AP, the AP directs, only at the target slot, a beam to a sector in which an STA corresponding to the target slot is located. Therefore, for the STA, if the STA does not receive the data packet that is sent by the AP to the STA and that indicates the channel use duration, a communications sector in which the STA communicates with the AP is not determined, and the STA randomly selects, based on a carrier sense multiple access with collision avoidance (CSMA/CA) mechanism shown in FIG. 1, a slot to transmit a signal. The CSMA/CA uses an ACK signal to avoid collision, that is, only when receiving the ACK signal returned from the network, a transmit end acknowledges that the sent data has correctly arrived at a destination address. As described in the prior art, when the technology is used, the station cannot detect whether there is a collision on the channel when sending the data packet, and the station can only try to "avoid" a collision. Therefore, if the STA sends the data packet at the slot that is not specified by the AP for the STA, or the STA does not receive the data packet that is sent by the AP and that includes the channel use duration, the STA may use the CSMA/CA mechanism in the prior art to communicate with the AP. When the STA receives the data packet that is sent by the AP and that includes the channel use duration, it indicates that the sector in which the STA communicates with the AP is determined. When the target slot arrives, the antenna of the AP directs to the sector corresponding to the target slot, and the AP and the STA transmit and receive a signal based on the specified slot. For the work state of the STA, refer to FIG. 4.

In the multi-beam polling based transmission method provided in this embodiment, the STA obtains the beacon message broadcast by the access point AP, where the beacon message is used to indicate the duration of the beacon period; receives the data packet that includes the channel use duration and that is sent by the AP; and determines, based on the channel use duration in the data packet, the target slot at which the STA communicates with the AP within the duration range of the beacon period, so that the STA can communicate with the AP at the target slot. In this solution, the STA communicates with the AP in a sector specified by the specified AP based on multi-beam polling. By receiving the target slot allocated by the AP, directional communication can be used to replace omnidirectional communication, and this helps to improve a system gain while ensuring long-distance transmission. Moreover, orderly communication between each STA and the AP can be implemented, thereby improving interaction efficiency, and greatly alleviating a problem of communication collisions between STAs.

Figure 9:
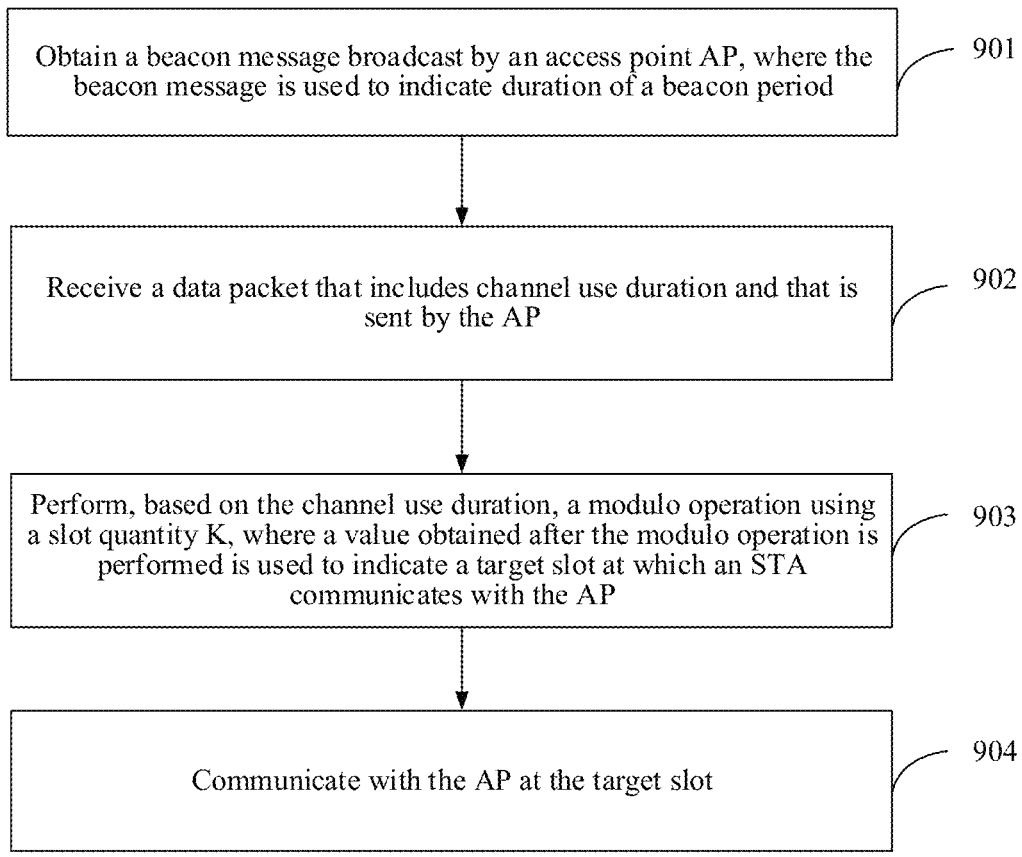
FIG. 9 is a schematic flowchart of a multi-beam polling based transmission method according to another embodiment of the present disclosure.

FIG. 9 is a schematic flowchart of a multi-beam polling based transmission method according to another embodiment of the present disclosure. As shown in FIG. 9, based on the foregoing embodiment, this embodiment provides a multi-beam polling based transmission method, including the following operations.

Operation 901. Obtain a beacon message broadcast by an access point AP, where the beacon message is used to indicate duration of a beacon period.

Specifically, the beacon period may include: a beacon header slot (Beacon header Interval, "BHI"), and a data transmission slot (Data transmission Interval, "DTI"). The AP broadcasts the beacon message in the duration range of the beacon header slot. Usually, the BHI occupies a public slot, for example, duration of 2 ms, or hundreds of microseconds for transmission. Duration of the public slot may be configured by a person skilled in the art based on characteristics of a channel. This is not specifically limited in the present disclosure. The duration of the DTI needs to be calculated based on the duration that is of the beacon period and that is indicated in the beacon message. For example, the beacon period is 100 ms, the BHI occupies 2 ms and the DTI occupies 98 ms. The data transmission slot DTI includes: M repetition periods, where each repetition period includes K slots; and M and K are positive integers greater than or equal to 1. Therefore, after receiving the beacon message, the STA may first determine a structure of the beacon period shown in a part A of FIG. 6, and then determine, based on a quantity M of the repetition periods, and a quantity K of the slots included in each repetition period, a slot division structure of the beacon period shown in a part B of FIG. 6. The quantity M of the repetition periods, and the quantity K of the slots included in each repetition period may be parameters preconfigured for the AP and each STA. To be specific, after a controller that controls the AP and a controller that controls the STA are started, values of M and K are preset in control software, so that after receiving the broadcast message of the beacon period, the STA can obtain, based on the known M and K, a beacon period configuration synchronized with the beacon period set by the AP. The solution of presetting M and K can effectively reduce overheads consumed in transmitting M and K, thereby reducing the channel resources.

In one embodiment, to implement a more flexible beacon period division, and enable the AP to more flexibly allocate the specified target slot based on attribute information such as channel quality, a quantity of STAs, and distribution of the STAs, the parameter values of M and K may also be sent to each STA with the beacon broadcast message. Therefore, the quantity M of the repetition periods, and the quantity K of the slots included in each repetition period may be included in the beacon message, so that the STA parses the beacon message after obtaining the beacon message broadcast by the access point AP, to obtain the quantity M of the repetition periods, and the quantity K of the slots included in each repetition period, thereby performing flexible slot division on the DTI.

Operation 902. Receive a data packet that includes channel use duration and that is sent by the AP.

Specifically, the channel use duration implies information indicating the target slot at which the AP communicates with the STA within the duration range of the beacon period. To minimize the modification of the existing 802.11 protocol, and to achieve a technical objective of this embodiment, the channel use duration may be included in at least one of the following data packets: a media access control MAC data packet, a request to send (RTS) data packet, a clear to send (CTS) data packet, and a decline to send (DTS) data packet. The basic concept of the RTS/CTS transmission mechanism is that before data is sent, a small segment of a request to send RTS packet is first sent to a target end, and the transmission starts after the target end responds to the CTS packet. An RTS/CTS handshake program is used to ensure that no collision occurs when data is subsequently transmitted. Because the packet of the RTS/CTS is small, invalid overheads of transmission are reduced. However, due to the existence of the "hidden terminal" in the background, even if the RTS/CTS transmission mechanism is used, collisions between stations cannot be avoided. However, because the RTS/CTS packet is short, even if there is a collision, the loss is limited. However, if the AP beam polling solution of the present disclosure is used based on the RTS/CTS transmission mechanism, the occurrence of collision can be avoided to the greatest extent. Therefore, the AP may include the duration information in the RTS/CTS data packet, so that the STA communicates with the AP at the specified target slot. For example, the duration information may be set in a second field of each data packet shown in FIG. 7a to FIG. 7d. FIG. 7a shows an 802.11 MAC data packet format, FIG. 7b shows an RTS data packet format, FIG. 7c shows a CTS data packet format, and FIG. 7d shows a DTS data packet format, so that after parsing the second field Duration of each data packet, the STA obtains a parameter value of the duration. It should be noted that the data packets described above are only examples and are not intended to limit this embodiment. It can be understood that the channel use duration may be included in any type of data packets used for the AP to communicate with the STA.

Operation 903. Perform, based on the channel use duration, a modulo operation using the slot quantity K, where a value obtained after the modulo operation is performed is used to indicate the target slot at which the STA communicates with the AP.

For example, a beacon period is 100 ms, a header of the BHI occupies 2 ms, the quantity M of repetition periods is equal to 7, the quantity K of slots in each repetition period is equal to 7, and the duration of each slot is 2 ms. A Duration field in the AP data packet is set to 1998 microseconds. A modulo operation is performed, using K, on the Duration field in the AP data packet received by the STA (S=Duration MOD K), and a result of the modulo operation is the target slot. To be specific, the result of the modulo operation is 1998 MOD 7=3, and the STA is located at a third slot. The STA communicates with the AP at the third slot of each repetition period when M=1 to M=7. Generally, a difference of a few microseconds in Duration does not significantly affect capacity. The STA communicates with the AP at each slot marked "3" in the beacon period shown in FIG. 6.

Operation 904. Communicate with the AP at the target slot.

Specifically, the AP directs, at the target slot, the antenna to the specified sector in which the STA communicates with the AP, thereby implementing one-to-one directional communication.

Figure 10:
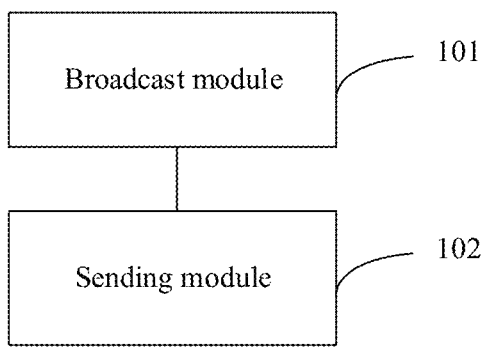
FIG. 10 is a schematic structural diagram of a multi-beam polling based transmission apparatus according to an embodiment of the present disclosure.

FIG. 10 is a schematic structural diagram of a multi-beam polling based transmission apparatus according to an embodiment of the present disclosure. As shown in FIG. 10, the multi-beam polling based transmission apparatus includes:

a broadcast module 101, configured for an access point AP to broadcast a beacon message, where the beacon message is used to indicate a beacon period; and a sending module 102, configured to: send a data packet that includes channel use duration to a station STA, where the channel use duration is used to indicate a target slot at which the AP communicates with the STA within a duration range of the beacon period; and communicate with the STA at the target slot.

The multi-beam polling based transmission apparatus in this embodiment may be configured to perform the method embodiment shown in FIG. 3. Implementation principles are similar. Details are not described herein again.

In the multi-beam polling based transmission apparatus provided in this embodiment, the access point AP broadcasts the beacon message, where the beacon message is used to indicate the duration of the beacon period; and sends the data packet that includes the channel use duration to the station STA, where the channel use duration is used to indicate the target slot at which the AP communicates with the STA within the duration range of the beacon period, so that the AP can communicate with the STA at the target slot. In this way, the AP polls the STA based on multiple beams. By allocating the target slot to the STA, directional communication can be used to replace omnidirectional communication, and this helps to improve a system gain while ensuring long-distance transmission. Moreover, orderly communication between each STA and the AP can be implemented, thereby improving interaction efficiency, and greatly alleviating a problem of communication collisions between STAs.

Figure 11:
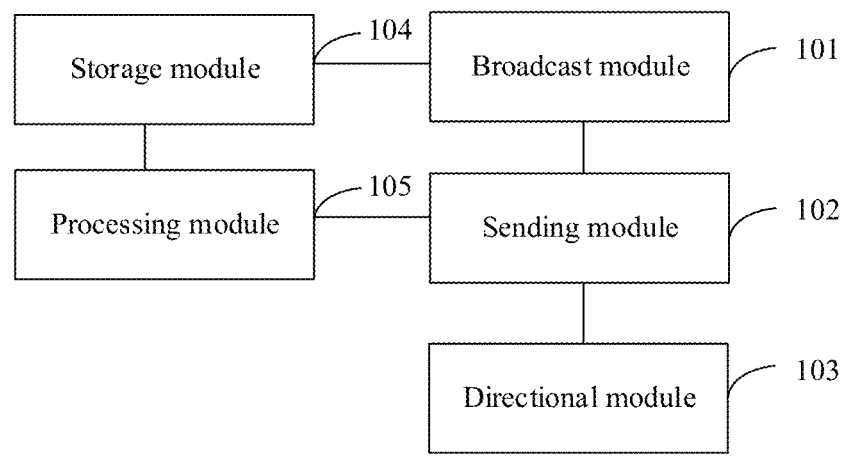
FIG. 11 is a schematic structural diagram of a multi-beam polling based transmission apparatus according to another embodiment of the present disclosure.

FIG. 11 is a schematic structural diagram of a multi-beam polling based transmission apparatus according to another embodiment of the present disclosure. As shown in FIG. 11, based on the foregoing embodiment, the apparatus further includes:

a directional module 103, configured to direct, at a target slot, an antenna to the STA corresponding to the target slot.

In one embodiment, the beacon period includes: a beacon header slot and a data transmission slot, where the data transmission slot includes: M repetition periods, where each repetition period includes K slots; and M and K are positive integers greater than or equal to 1.

In one embodiment, a broadcast module 101 is specifically configured to broadcast a beacon message at the beacon header slot.

In one embodiment, the apparatus further includes:

a storage module 104, configured to prestore a quantity M of the repetition periods, and a quantity K of the slots included in each repetition period; or the beacon message further includes a quantity M of the repetition periods, and a quantity K of the slots included in each repetition period.

In one embodiment, the apparatus further includes:

a processing module 105, configured to: determine communication duration based on a data volume of communication performed with the STA; and adjust, based on the target slot corresponding to the STA, the communication duration to obtain channel use duration. In one embodiment, the processing module 105 is specifically configured to adjust the communication duration, so that a value obtained from a modulo operation on the adjusted communication duration using the slot quantity K is used to indicate the target slot at which the STA communicates with the AP. In one embodiment, the sending module 102 is specifically configured to include the channel use duration into at least one piece of the following information for transmission to the STA:

a media access control MAC data packet, a request to send RTS data packet, a clear to send CTS data packet, and a decline to send DTS data packet.

The multi-beam polling based transmission apparatus in this embodiment may be configured to perform the method embodiment shown in FIG. 5. Implementation principles are similar, and details are not described herein again.

Figure 12:
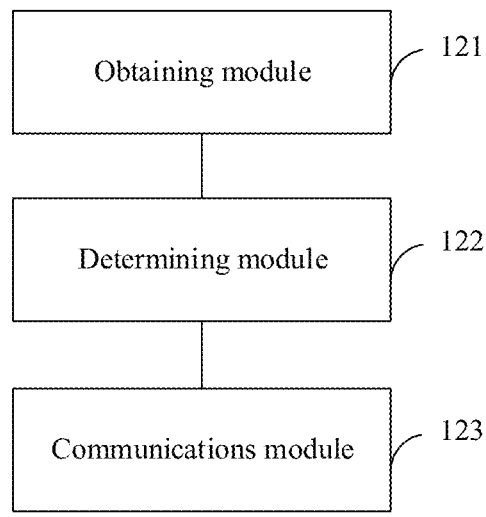
FIG. 12 is a schematic structural diagram of a multi-beam polling based transmission apparatus according to an embodiment of the present disclosure.

FIG. 12 is a schematic structural diagram of a multi-beam polling based transmission apparatus according to an embodiment of the present disclosure. As shown in FIG. 12, the multi-beam polling based transmission apparatus includes:

an obtaining module 121, configured to obtain a beacon message broadcast by an access point AP, where the beacon message is used to indicate duration of a beacon period; and is further configured to receive a data packet that includes channel use duration and that is sent by the AP;

a determining module 122, configured to determine, based on the channel use duration in the data packet, a target slot at which the determining module 122 communicates with the AP within a duration range of the beacon period; and a communications module 123, configured to communicate with the AP at the target slot.

The multi-beam polling based transmission apparatus in this embodiment may be configured to perform the method embodiment shown in FIG. 8. Implementation principles are similar. Details are not described herein again.

In the multi-beam polling based transmission apparatus provided in this embodiment, the STA receives the beacon message broadcast by the access point AP, where the beacon message is used to indicate the duration of the beacon period; receives the data packet that includes the channel use duration and that is sent by the AP; and determines, based on the channel use duration in the data packet, the target slot at which the STA communicates with the AP within the duration range of the beacon period, so that the STA can communicate with the AP at the target slot. In this solution, the STA communicates with the AP in a sector specified by the specified AP based on multi-beam polling. By receiving the target slot allocated by the AP, directional communication can be used to replace omnidirectional communication, and this helps to improve a system gain while ensuring long-distance transmission. Moreover, orderly communication between each STA and the AP can be implemented, thereby improving interaction efficiency, and greatly alleviating a problem of communication collisions between STAs.

Figure 13:
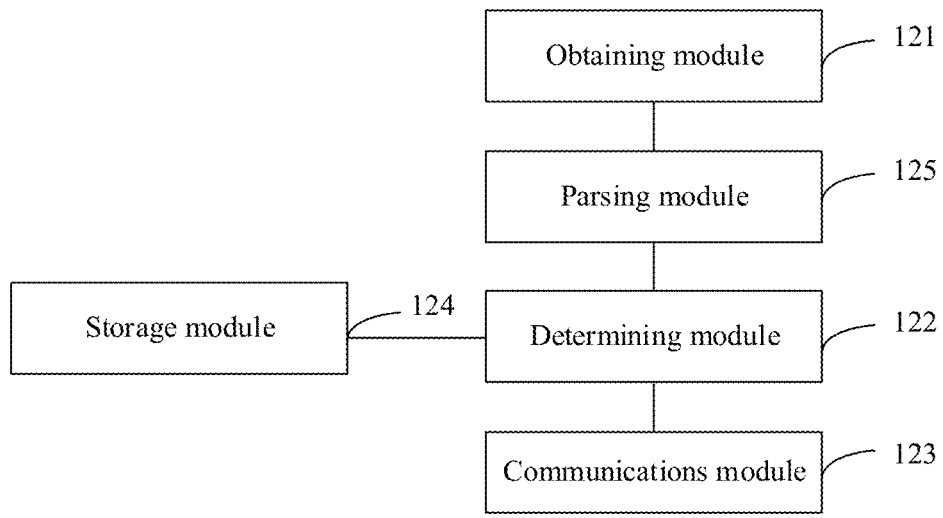
FIG. 13 is a schematic structural diagram of a multi-beam polling based transmission apparatus according to another embodiment of the present disclosure.

FIG. 13 is a schematic structural diagram of a multi-beam polling based transmission apparatus according to another embodiment of the present disclosure. As shown in FIG. 13, based on the foregoing embodiment, the beacon period includes: a beacon header slot and a data transmission slot; and the data transmission slot includes: M repetition periods, where each repetition period includes K slots; and M and K are positive integers greater than or equal to 1.

In one embodiment, the obtaining module 121 is specifically configured to obtain, at the beacon header slot, the beacon message broadcast by the AP.

The determining module 122 is further configured to perform slot division on the data transmission slot based on duration of the beacon period and a quantity M of the repetition periods and a quantity K of the slots included in each repetition period.

In one embodiment, the apparatus further includes:

a storage module 124, configured to prestore the quantity M of the repetition periods, and the quantity K of the slots included in each repetition period; or the beacon message further includes the quantity M of the repetition periods, and the quantity K of the slots included in each repetition period.

The apparatus further includes:

a parsing module 125, configured to parse the beacon message, to obtain the quantity M of the repetition periods, and the quantity K of the slots included in each repetition period.

In one embodiment, the determining module 122 is specifically configured to perform, based on channel use duration, a modulo operation using the slot quantity K, where a value obtained after the modulo operation is performed is used to indicate the target slot at which the STA communicates with the AP.

In one embodiment, the obtaining module 121 is specifically configured to receive the channel use duration that is sent by the AP and that is included in at least one of the following data packets:

a media access control MAC data packet, a request to send RTS data packet, a clear to send CTS data packet, and a decline to send DTS data packet. The multi-beam polling based transmission apparatus in this embodiment may be configured to perform the method embodiment shown in FIG. 9. Implementation principles are similar. Details are not described herein again.

Figure 14:
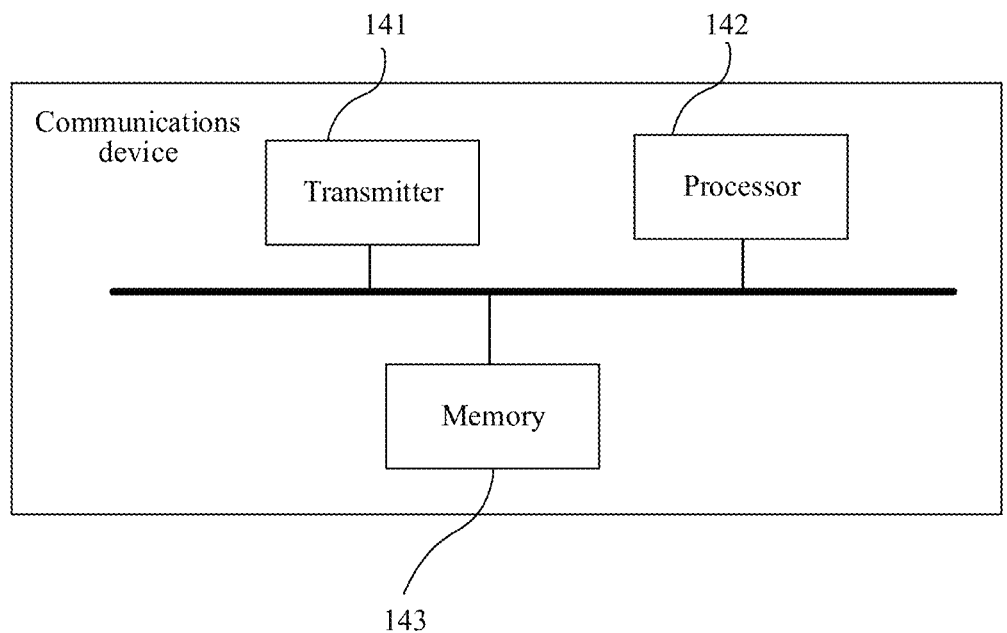
FIG. 14 is a schematic structural diagram of a communications device according to an embodiment of the present disclosure.

FIG. 14 is a schematic structural diagram of a communications device according to an embodiment of the present disclosure. The communications device may be an access point device such as a mobile terminal device, a base station device, a router device, a wireless switch, a server device, and the like that have a communications function. As shown in FIG. 14, the present disclosure provides a communications device, including a transmitter 141 and a processor 142.

The transmitter 141 may be connected to the processor 142 by using a bus. Certainly, in an actual application, the transmitter 141 and the processor 142 may not form a bus structure, but may form another structure, for example, a star structure. This is not specifically limited in the present disclosure.

In one embodiment, the processor 142 may be specifically a general-purpose central processing unit or an ASIC, one or more integrated circuits configured to control program execution, a hardware circuit developed by using an FPGA, or a baseband processor.

In one embodiment, the processor 142 may include at least one processing core.

The communications device may be configured to perform any one of the foregoing methods of the embodiments shown in FIG. 3 and FIG. 5.

The transmitter 141 is configured to broadcast a beacon message, where the beacon message is used to indicate duration of a beacon period; and is further configured to send a data packet that includes channel use duration to a station STA, where the channel use duration is used to indicate a target slot at which an AP communicates with the STA within a duration range of the beacon period.

The processor 142 is configured to communicate with the STA at the target slot.

In one embodiment, the processor 142 is further configured to direct, at the target slot, an antenna to the STA corresponding to the target slot.

In one embodiment, the beacon period includes: a beacon header slot and a data transmission slot, where the data transmission slot includes: M repetition periods, where each repetition period includes K slots; and M and K are positive integers greater than or equal to 1.

In one embodiment, the transmitter 141 is specifically configured to broadcast the beacon message at the beacon header slot.

In one embodiment, the communications device further includes: a memory 143. The transmitter 141, the processor 142 and the memory 143 may be connected by using a bus.

The memory 143 is configured to prestore a quantity M of the repetition periods, and a quantity K of the slots included in each repetition period.

In one embodiment, the memory 143 may include one or more of a ROM, a RAM, and a magnetic disk memory. The memory 143 is configured to store data and/or instructions required during running of the processor 142. There may be one or more memories 143;

or the beacon message further includes a quantity M of the repetition periods, and a quantity K of the slots included in each repetition period.

In one embodiment, the processor 142 is further configured to: determine communication duration based on a data volume of communication performed with the STA; and adjust, based on the target slot corresponding to the STA, the communication duration to obtain the channel use duration.

In one embodiment, the processor 142 is specifically configured to adjust the communication duration, so that a value obtained from a modulo operation on the adjusted communication duration using the slot quantity K is used to indicate the target slot at which the STA communicates with the AP.

In one embodiment, the transmitter 141 is configured to include the channel use duration into at least one of the following data packets for transmission to the STA:

a media access control MAC data packet, a request to send RTS data packet, a clear to send CTS data packet, and a decline to send DTS data packet.

Figure 15:
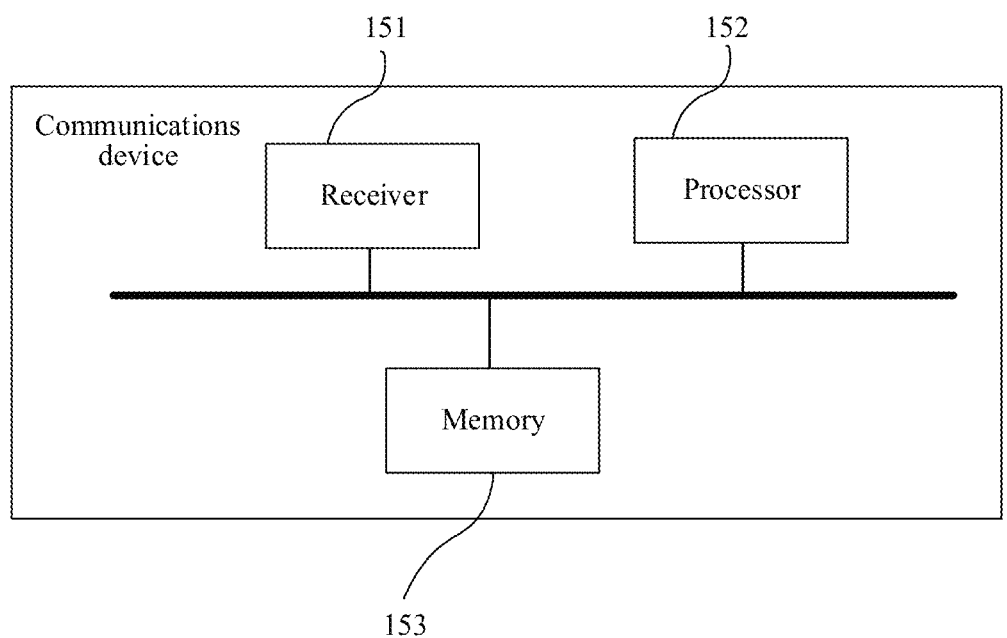
FIG. 15 is a schematic structural diagram of a communications device according to an embodiment of the present disclosure.

FIG. 15 is a schematic structural diagram of a communications device according to an embodiment of the present disclosure. As shown in FIG. 15, the present disclosure provides a communications device, for example, a base station device, including a receiver 151, and a processor 152.

The receiver 151 may be connected to the processor 152 by using a bus. Certainly, in an actual application, the receiver 151 and the processor 152 may not form a bus structure, but may form another structure, for example, a star structure. This is not specifically limited in the present disclosure.

In one embodiment, the processor 152 may be specifically a general-purpose central processing unit or an ASIC, one or more integrated circuits configured to control program execution, a hardware circuit developed by using an FPGA, or a baseband processor.

In one embodiment, the processor 152 may include at least one processing core.

The communications device may be configured to perform any one of the foregoing methods of the embodiments shown in FIG. 8 and FIG. 9.

The receiver 151 is configured to receive a beacon message broadcast by an access point AP, where the beacon message is used to indicate duration of a beacon period; and is further configured to receive a data packet that includes channel use duration and that is sent by the AP.

The processor 152 is configured to determine, based on the channel use duration in the data packet, a target slot at which the processor 152 communicates with the AP within a duration range of the beacon period; and is further configured to communicate with the AP at the target slot.

In one embodiment, the beacon period includes: a beacon header slot and a data transmission slot, where the data transmission slot includes: M repetition periods, where each repetition period includes K slots; and M and K are positive integers greater than or equal to 1.

In one embodiment, the receiver 151 is specifically configured to receive, at the beacon header slot, the beacon message broadcast by the access point AP; and the processor 152 is further configured to perform slot division on the data transmission slot based on duration of the beacon period, and a quantity M of the repetition periods and a quantity K of the slots included in each repetition period.

In one embodiment, the communications device further includes: a memory 153. The receiver 151, the processor 152 and the memory 153 may be connected by using a bus.

The memory 153 is configured to prestore the quantity M of the repetition periods, and the quantity K of the slots included in each repetition period.

In one embodiment, the memory 153 may include one or more of a ROM, a RAM, and a magnetic disk memory. The memory 153 is configured to store data and/or instructions required during running of the processor 152. There may be one or more memories 153.

Alternatively, the beacon message further includes the quantity M of the repetition periods, and the quantity K of the slots included in each repetition period.

The processor 152 is further configured to parse the beacon message, to obtain the quantity M of the repetition periods, and the quantity K of the slots included in each repetition period.

In one embodiment, the processor 152 is further configured to perform, based on the channel use duration, a modulo operation using the slot quantity K, where a value obtained after the modulo operation is performed is used to indicate the target slot at which the STA communicates with the AP.

In one embodiment, the receiver 151 is specifically configured to receive the channel use duration that is sent by the AP and that is included in at least one of the following data packets:

a media access control MAC data packet, a request to send RTS data packet, a clear to send CTS data packet, and a decline to send DTS data packet.

The present disclosure further provides an electronic device readable storage medium, including a program. When the program runs on an electronic device, the electronic device is enabled to perform the method according to any one of the foregoing embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive (SSD)), or the like.

A person skilled in the art should be aware that in the foregoing one or more examples, functions described in the embodiments of the present disclosure may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium. The communications medium includes any medium that facilitates a computer program to be transmitted from one place to another. The storage medium may be any available medium accessible to a general-purpose or special-purpose computer.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, and such modifications or replacements do not cause the essence of corresponding technical solutions to depart from the spirit and scope of the technical solutions in the embodiments of the present disclosure.

What is claimed is:

1. A multi-beam polling based transmission method, comprising:
    broadcasting, by an access point (AP), a beacon message, wherein the beacon message is used to indicate duration of a beacon period;
    inserting a channel use duration into a decline to send (DTS) data packet or a decline to send (DTS) data packet and a media access control MAC data packet;

sending a data packet that comprises the channel use duration to a station (STA), wherein the channel use duration is used to indicate a target slot at which the AP communicates with the STA within a duration range of the beacon period; and communicating with the STA at the target slot.

2. The method according to claim 1, wherein before the communicating with the STA at the target slot, the method further comprises:

directing, at the target slot, an antenna to the STA corresponding to the target slot.

3. The method according to claim 1, wherein the beacon period comprises: a beacon header slot and a data transmission slot; and the data transmission slot comprises: M repetition periods, wherein each repetition period comprises K slots; and M and K are positive integers greater than or equal to 1.

4. The method according to claim 3, wherein the broadcasting, by an access point (AP), a beacon message comprises:

broadcasting, by the AP, the beacon message at the beacon header slot.

5. The method according to claim 4, wherein a quantity M of the repetition periods, and a quantity K of the slots comprised in each repetition period are parameters preconfigured for the AP; or the beacon message further comprises a quantity M of the repetition periods, and a quantity K of the slots comprised in each repetition period.

6. The method according to claim 5, wherein before the sending a data packet that comprises channel use duration to a station (STA), the method further comprises:

determining, by the AP, communication duration based on a data volume of communication performed with the STA; and adjusting, based on the target slot corresponding to the STA, the communication duration to obtain the channel use duration.

7. The method according to claim 6, wherein the adjusting, based on the target slot corresponding to the STA, the communication duration comprises:

adjusting the communication duration, so that a value obtained from a modulo operation on the adjusted communication duration using the slot quantity K is used to indicate the target slot at which the STA communicates with the AP.

8. A multi-beam polling based transmission method, comprising:

obtaining, by a station (STA), a beacon message broadcast by an access point (AP), wherein the beacon message is used to indicate duration of a beacon period;

receiving a data packet that comprises channel use duration and that is sent by the AP and that is inserted in at least a decline to send (DTS) data packet or a decline to send (DTS) data packet and a media access control MAC data packet;

determining, based on the channel use duration in the data packet, a target slot at which the STA communicates with the AP within a duration range of the beacon period; and communicating with the AP at the target slot.

9. The method according to claim 8, wherein the beacon period comprises: a beacon header slot and a data transmission slot; and the data transmission slot comprises: M repetition periods, wherein each repetition period comprises K slots; and M and K are positive integers greater than or equal to 1.

10. The method according to claim 9, wherein the obtaining, by a station (STA), a beacon message broadcast by an access point (AP) comprises:

obtaining, at the beacon header slot, the beacon message broadcast by the AP; and after the obtaining, by a station (STA), a beacon message broadcast by an access point (AP), the method further comprises:

performing, by the STA, slot division on the data transmission slot based on duration of the beacon period, and a quantity M of the repetition periods and a quantity K of the slots comprised in each repetition period.

11. The method according to claim 10, wherein the method further comprises:

the quantity M of the repetition periods, and the quantity K of the slots comprised in each repetition period are parameters preconfigured for the STA; or the beacon message further comprises the quantity M of the repetition periods, and the quantity K of the slots comprised in each repetition period; and after the obtaining, by a station STA, a beacon message broadcast by an access point AP, the method further comprises:

parsing, by the STA, the beacon message, to obtain the quantity M of the repetition periods, and the quantity K of the slots comprised in each repetition period.

12. The method according to claim 11, wherein the determining, based on the channel use duration in the data packet, a target slot at which the STA communicates with the AP within a duration range of the beacon period comprises:

performing, based on the channel use duration, a modulo operation using the slot quantity K, wherein a value obtained after the modulo operation is performed is used to indicate the target slot at which the STA communicates with the AP.

13. A communications device, comprising a transmitter and a processor, wherein the transmitter is configured to:

broadcast a beacon message, wherein the beacon message is used to indicate duration of a beacon period;

insert a channel use duration into a decline to send (DTS) data packet or a decline to send (DTS) data packet and a media access control MAC data packet; and send a data packet that comprises channel use duration to a station (STA), wherein the channel use duration is used to indicate a target slot at which an access point AP communicates with the STA within a duration range of the beacon period; and the processor is configured to communicate with the STA at the target slot.

14. The communications device according to claim 13, wherein the processor is further configured to direct, at the target slot, an antenna to the STA corresponding to the target slot.

15. The communications device according to claim 13, wherein the beacon period comprises: a beacon header slot and a data transmission slot; and the data transmission slot comprises: M repetition periods, wherein each repetition period comprises K slots; and M and K are positive integers greater than or equal to 1.

16. The communications device according to claim 15, wherein
the transmitter is configured to broadcast the beacon message at the beacon header slot.

17. The communications device according to claim 16, further comprising a memory, wherein
the memory is configured to prestore a quantity M of the repetition periods, and a quantity K of the slots comprised in each repetition period; or
the beacon message further comprises a quantity M of the repetition periods, and a quantity K of the slots comprised in each repetition period.

18. The communications device according to claim 17, wherein
the processor is further configured to: determine communication duration based on a data volume of communication performed with the STA; and adjust, based on the target slot corresponding to the STA, the communication duration to obtain the channel use duration.

* * * * *